United States Patent
Levert

(10) Patent No.: US 8,042,764 B2
(45) Date of Patent: Oct. 25, 2011

(54) NUT SYSTEM AND AIRCRAFT ENGINE MOUNTING STRUCTURE COMPRISING SAME

(75) Inventor: Stephane Levert, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 774 days.

(21) Appl. No.: 12/089,312

(22) PCT Filed: Oct. 10, 2006

(86) PCT No.: PCT/EP2006/067217
§ 371 (c)(1),
(2), (4) Date: Apr. 4, 2008

(87) PCT Pub. No.: WO2007/042508
PCT Pub. Date: Apr. 19, 2007

(65) Prior Publication Data
US 2008/0232924 A1 Sep. 25, 2008

(30) Foreign Application Priority Data
Oct. 12, 2005 (FR) ..................................... 05 53102

(51) Int. Cl.
*B64D 27/00* (2006.01)

(52) U.S. Cl. ........................................................ 244/54
(58) Field of Classification Search .......... 411/119–122, 411/214, 215, 220; 244/54
See application file for complete search history.

(56) References Cited

U.S. PATENT DOCUMENTS

| | | | | |
|---|---|---|---|---|
| 684,928 A * | 10/1901 | Fletcher | ........................ | 411/271 |
| 893,081 A * | 7/1908 | Kunan | ........................ | 411/214 |
| 1,230,745 A * | 6/1917 | Madison | ........................ | 411/214 |
| 1,241,181 A * | 9/1917 | Wilhelm | ........................ | 411/201 |
| 3,964,530 A * | 6/1976 | Nickles | ........................ | 411/195 |
| 4,266,590 A | 5/1981 | McKewan | | |
| 4,781,502 A | 11/1988 | Kushnick | | |
| 4,846,614 A | 7/1989 | Steinbock | | |
| 5,391,032 A * | 2/1995 | Vassalotti | ..................... | 411/214 |
| 5,452,575 A | 9/1995 | Freid | | |
| 6,290,442 B1* | 9/2001 | Peterkort | ..................... | 411/140 |
| 2005/0067528 A1* | 3/2005 | Loewenstein et al. | ......... | 244/54 |
| 2007/0069069 A1* | 3/2007 | Diochon et al. | ................ | 244/54 |
| 2008/0023584 A1* | 1/2008 | Beaufort | ........................ | 244/54 |
| 2008/0042007 A1* | 2/2008 | Machado | ........................ | 244/54 |

FOREIGN PATENT DOCUMENTS

| | | |
|---|---|---|
| EP | 0 879 759 | 11/1998 |
| GB | 2 010 969 | 7/1979 |
| RU | 2 191 299 | 10/2002 |

* cited by examiner

*Primary Examiner* — Joshua Michener
*Assistant Examiner* — Keith L Dixon
(74) *Attorney, Agent, or Firm* — Oblon, Spivak, McClelland, Maier & Neustadt, L.L.P.

(57) ABSTRACT

A nut system including a nut including a main thread with pitch p1 and arranged along a screwing axis of the nut. A threaded device is coupled in rotation with the nut, the threaded device including a secondary non-screwed thread on the main thread from which it is separated, the secondary thread being arranged along the screwing axis and having a pitch p2 different from p1. Such a nut system may find application with a device for resistance of thrusts generated by an aircraft engine.

18 Claims, 11 Drawing Sheets

NUT SYSTEM AND AIRCRAFT ENGINE MOUNTING STRUCTURE COMPRISING SAME

TECHNICAL DOMAIN

This invention relates in general to the domain of nut systems used to create simple and secure mechanical links between different elements.

It is particularly but not exclusively applicable to the field of aircraft engine suspension pylons, each pylon being designed to be inserted between an aircraft wing and its associated engine.

The invention may be used on any aircraft type, for example equipped with turbojets or turboprops.

This type of suspension pylon is also called an EMS (Engine Mounting Structure), and can be used to fit a turbojet below the aircraft wing, or to fit this turbojet above the same wing.

STATE OF PRIOR ART

This type of suspension pylon is designed to form the connection interface between a turbojet and an aircraft wing. It transmits forces generated by its associated turboengine to the structure of this aircraft, and it also enables routing of fuel, electrical and hydraulic systems, and air between the engine and the aircraft.

In order to transmit forces, the suspension device comprises a rigid structure frequently of the "box" type, in other words formed by the assembly of upper and lower spars and side panels connected to each other through transverse ribs.

The device is also provided with suspension means inserted between the turboengine and the rigid structure, these means globally comprising two engine attachments, and a device for resisting thrusts generated by the turboengine.

In prior art, this device is in the form of two lateral rods connected firstly to an aft part of the turboengine fan casing, and secondly to an aft attachment fixed to the turboengine central casing.

For information, note that the suspension device also comprises another series of attachments forming an assembly system inserted between the rigid structure and the aircraft wing, this system normally being composed of two or three attachments.

Finally, the pylon is provided with a secondary structure for segregating and holding systems in place, while supporting aerodynamic fairings.

Solutions proposed in the past usually allowed for the thrust resistance device to include a spreader beam onto which the two aft ends of the two resisting rods are connected, this spreader beam being passed through by a pin system that also passing through a fitting fixed to the rigid structure, also called the primary structure.

Thus, it is usually planned to install a nut system on one end of the pin system, to prevent it from escaping from the spreader beam. The nut system is then composed of a single nut, possibly used in combination with a conventional anti-rotation system, for example like a serrated anti-rotation washer.

However, it has been found that this type of arrangement cannot satisfy current safety requirements, that only offer a limited degree of safety.

SUMMARY OF THE INVENTION

Therefore, the first purpose of the invention is to propose a nut system with a simple design that is more reliable and safer than is possible with embodiments according to prior art.

Another purpose of the invention is to present a thrust resistance device integrating such a nut system.

To achieve this, the object of the invention is a nut system comprising a nut provided with a main thread with pitch p1 and arranged along a screwing axis of the nut, and also comprising a threaded device coupled in rotation with the nut about the screwing axis, this threaded device comprising a secondary non-screwed thread on the main thread from which it is separated, the secondary thread being arranged along the screwing axis of the nut and having a pitch p2 different from p1 and preferably less than p1.

Consequently, it should be understood that the nut system may be installed on a threaded receiving assembly by means of its main thread provided on the nut, and its secondary thread formed on the threaded device coupled in rotation with this same nut.

Thus, if the nut comes loose, the angular displacement of this nut is identical to the angular displacement of the threaded device to which it is coupled, but the difference in pitch between the main thread and the secondary thread means that these two elements will have a different linear displacement. Consequently, if this nut can loose in such a manner, it will quickly lock the nut system on its associated receiver assembly, which provides a quite satisfactory safety and reliability.

When this nut system according to the invention is used in combination with conventional anti-rotation means cooperating with the nut such as a serrated anti-rotation washer, the threaded device according to the system can be treated like an emergency device also called a <<Fail Safe>> device, to the extent that it can prevent the nut from current loose if the serrated washer should fail.

Preferably, the main and secondary threads are designed to be screwed onto a complementary main thread with pitch p1 and onto a complementary secondary thread with pitch p2 respectively.

Preferably, the threaded device is fixed to the nut and it is composed of a screw passing through the nut. Nevertheless, the threaded device could be of the female type capable of being fitted with a screw without going outside the framework of the invention.

If the threaded device is composed of a screw, this screw can then be fixed to the nut through an anti-rotation plate installed fixed on the nut and cooperating with a head of the screw.

Although the nut system according to the invention that has just been described can be used on any type of receiving assembly, one preferred application concerns its use on a device for resisting thrusts generated by an aircraft engine.

Another object of the invention is a device for resisting thrusts generated by an aircraft engine, the device being designed to be inserted between the engine and a rigid structure of a suspension pylon of this engine and comprising the following elements:

a fitting designed to be installed fixed on the rigid structure;
  a pin system passing through the fitting;
  two lateral thrust resistance rods, each comprising a forward end that will be connected to the engine, and an aft end;
  a spreader beam onto which the two aft ends of the lateral thrust resistance rods are hinged, this spreader beam being passed through by the pin system; and
  a nut system like that described above, this system being assembled on the pin system and bearing on the spreader beam.

Preferably, the device comprises a pin extension device supported on the inside by the pin system, and used to facilitate implementation of the engine mounting process onto the rigid pylon structure, as will be described later in the following description.

Preferably, the pin extension device is a screw fitted on the pin system, this screw penetrating inside this pin system. Furthermore, the threaded device of the nut system is screwed onto this pin extension device and is preferably arranged coaxially with it.

The pin system preferably comprises an inner pin and a concentric outer pin, these two pins being fixed to each other and the inner pin being hollow so that it can act as a housing for the pin extension device.

Also preferably, the nut in the nut system is mounted on the outer pin.

Finally as mentioned above, the thrust resistance device preferably comprises an anti-rotation washer cooperating with the nut in the nut system and being inserted between it and the spreader beam.

Another object of the invention is an assembly comprising a receiving assembly and a nut system like that described above and mounted on the receiving assembly, the main thread being screwed onto a complementary main thread with pitch p1 formed on the receiving assembly, and the secondary thread being screwed on a complementary secondary thread with pitch p2 formed on the receiving assembly.

Another object of this invention relates to an engine suspension pylon designed to be inserted between an aircraft wing and the engine, this pylon comprising a rigid structure and means of fastening the engine onto the rigid structure, these suspension means comprising a thrust resistance device to resist thrusts generated by the engine like that described above.

Other advantages and characteristics of the invention will become clear by reading the non-limitative detailed description given below.

BRIEF DESCRIPTION OF THE DRAWINGS

This description will be made with reference to the appended drawings among which;

FIG. 5b shows a partial exploded perspective view of the thrust resistance device shown on FIG. 5a;

DETAILED DESCRIPTION OF PREFERRED EMBODIMENTS

Figure 7:
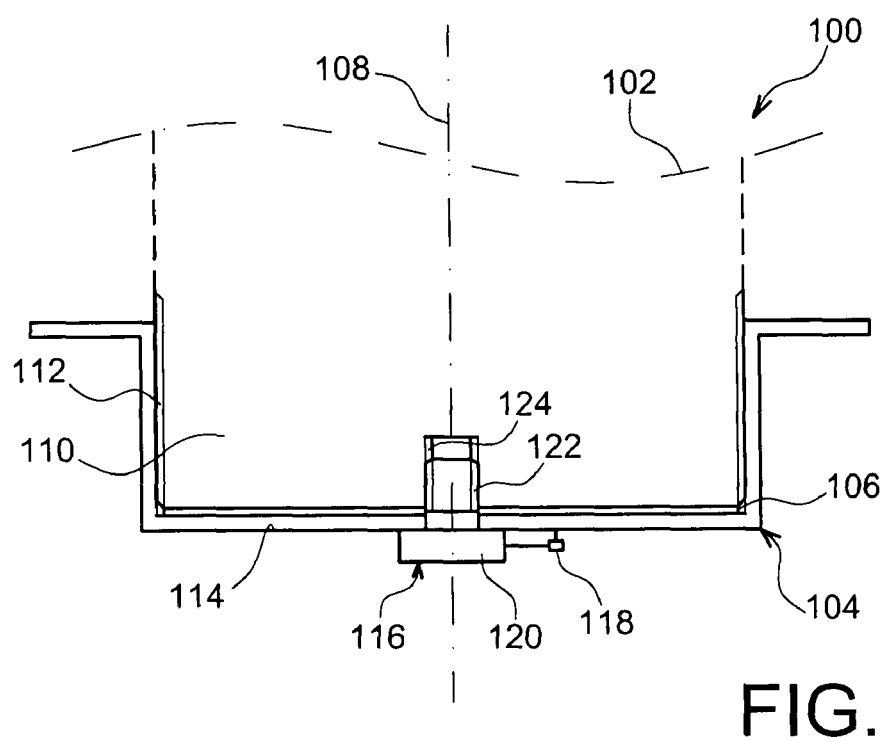
FIG. 7 is a diagrammatic sectional view showing the principal of the invention.

With reference firstly to FIG. 7, the figure shows a nut system 100 according to the principle of this invention, this system 100 being designed to be installed on an arbitrary receiving assembly 102.

The system 100 comprises a nut 104 provided with a principal inner thread 106, arranged along a screwing axis 108 also corresponding to a principal axis of the nut. The principal thread 106 has pitch p1 and is screwed onto a threaded end 110 of the receiving assembly 102 that has a complementary principal outer thread 112, also with pitch p1.

This nut 104 is provided with a cap 114 that closes it off, this cap being arranged orthogonal to the screwing axis 108.

There is also a threaded device 116 arranged along the screwing axis 108 such as a screw, arranged transverse to the cap 114 of the nut 104. This threaded device 116 is coupled in rotation with this nut 104 and is preferably fixed to it. This is achieved by the use of anti-rotation means 118 shown diagrammatically only, these means for example being in the form of an anti-rotation plate mounted fixed on the cap 114 of the nut, and cooperating with the head 120 of the screw 116.

Furthermore, this screw type threaded device 116 comprises a secondary thread 122 arranged along the axis 108 and having a pitch p2 not equal to p1 and preferably less than p1. This thread 122 is screwed into a pin hole 108 formed on the threaded end 110 of the receiving assembly 102, and provided with a complementary secondary inner thread 124, also with pitch p2.

In this nut system 100 capable of automatically blocking the nut 104 in case it comes loose due to the difference between the value of the two pitches p1 and p2, it can be understood that the threaded device 116 firstly has to be screwed onto the receiving assembly 102 before being fixed to the nut 104 already mounted on this same assembly 102.

Figure 1:
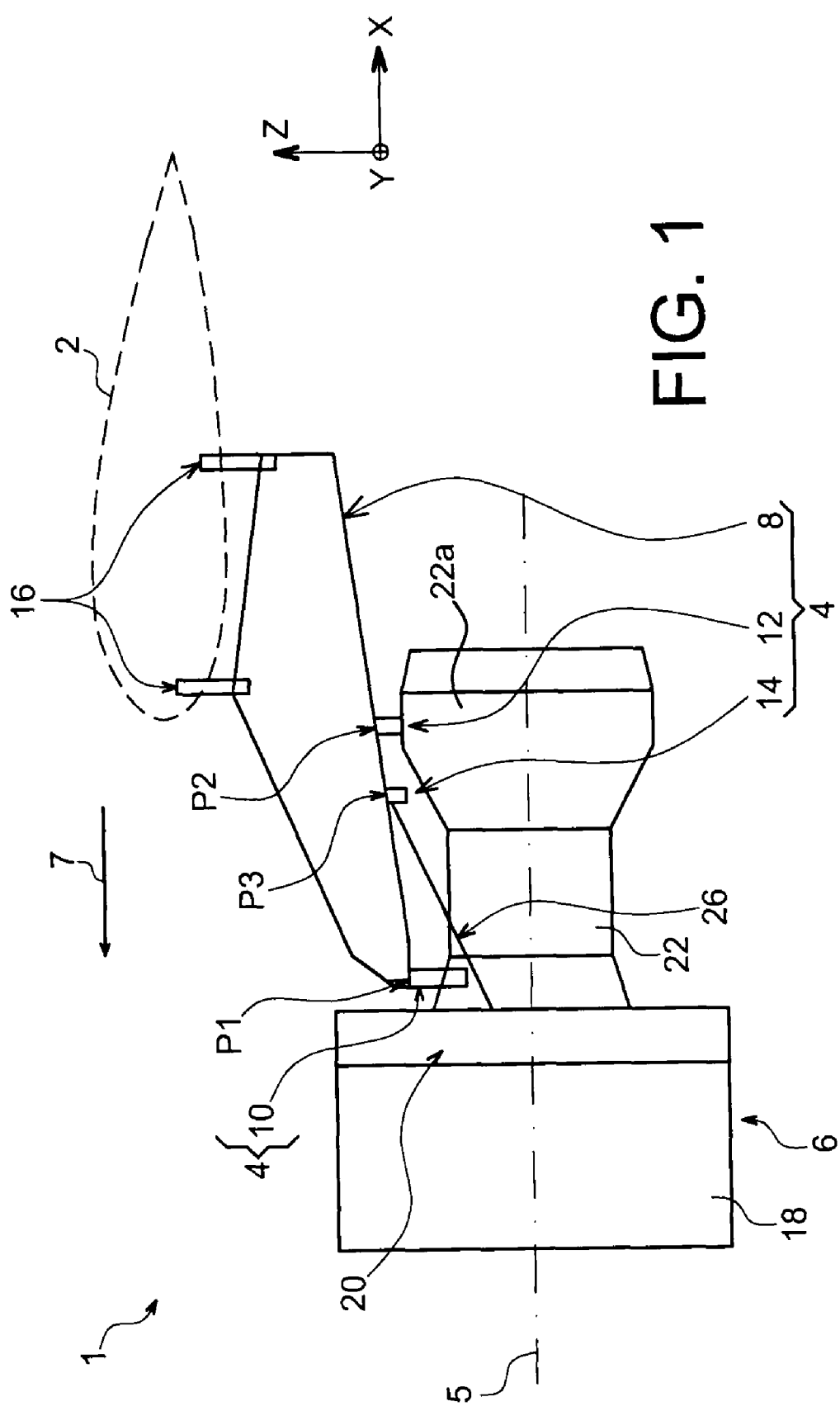
FIG. 1 shows a schematic side view of an aircraft engine assembly comprising a suspension pylon according to this invention.

FIG. 1 shows an aircraft engine assembly 1 designed to be fixed under a wing 2 of this aircraft shown only diagrammatically in dashed lines for reasons of clarity, this assembly 1 comprising a suspension pylon 4 according to a preferred embodiment of this invention, and an engine 6 such as a turbojet attached under this pylon 4.

Globally, the suspension pylon 4 comprises a rigid structure 8, also called the primary structure, carrying suspension means for the engine 6, these suspension means being provided with a plurality of engine attachments 10, 12, and a device 14 for resisting thrusts generated by the engine 6.

For guidance, note that the assembly 1 is designed to be surrounded by a pod (not shown), and that the suspension pylon 4 is fitted with another series of attachments 16 to suspend this assembly 1 under the aircraft wing 2.

Throughout the following description, by convention, X refers to the longitudinal direction of the device 4 that is also considered to be the same as the longitudinal direction of the turbojet 6, this X direction being parallel to a longitudinal axis 5 of this turbojet 6. Furthermore, the direction transverse to the device 4 is called the Y direction and is also considered to be the same as the transverse direction of the turbojet 6, and Z is the vertical direction or the height, these three X, Y and Z directions being orthogonal to each other.

Furthermore, the terms <<forward>> and <<aft>> should be considered with respect to a direction of motion of the aircraft that occurs as a result of the thrust applied by the turbojet 6, this direction being shown diagrammatically by the arrow 7.

FIG. 1 shows the two engine suspensions 10, 12, the series of attachment 16, the thrust resistance device 14 and the rigid structure 8 of the attachment device 4. The other constituents not shown of this device 4, such as the secondary structure segregating and holding the systems while supporting aerodynamic fairings, are conventional elements identical to or similar to those used in prior art, and known to an expert in the subject. Consequently, no detailed description of them will be made.

Furthermore, the turbojet 6 is provided with a large dimension fan casing 18 at the forward end and delimiting an annular fan duct 20 and comprises a smaller central casing 22 towards the aft and containing the core of this turbojet. Casings 18 and 20 are obviously fixed to each other.

As can be seen on FIG. 1, there are two engine suspensions 10, 12 of the device 4, respectively called the forward engine suspension and the aft engine suspension respectively.

In this preferred embodiment of this invention, the rigid structure 8 is in the form of a box extending from the aft end in the forwards direction approximately along the X direction.

The box 8 is then in a form similar to that normally observed for turbojet suspension pylons, particularly in the sense that it is provided with transverse ribs (not shown), each in the form of a rectangle, and connecting the forward and aft spars and side panels.

The suspension means in this preferred embodiment comprise firstly the forward engine attachment 10 inserted between the forward end of the rigid structure 8, and an upper part of the fan casing 18 or the central casing 22. The forward engine attachment 10, designed conventionally in a manner known to an expert in the subject, is fixed at a first point P1 of the rigid structure 8.

Secondly, the aft engine suspension 12 also made conventionally and in a manner known to an expert in the subject, is inserted between the rigid structure 8 and the central casing 22 or an aft casing 22*a*, and fixed at a second point P2 of the rigid structure 8 placed aft from the point P1.

Furthermore, the thrust resistance device 14 shown schematically is fixed at a third point P3 on the rigid structure 8, the point P3 preferably being located between the two points P1 and P2. In this respect, note that the three points mentioned above preferably belong to a vertical median plane of the suspension pylon (not shown).

Furthermore, for guidance, in a side view like that shown on FIG. 1, the ratio of the distances P1P3/P1P2 may be included within a wide range from 0.1 to 0.9, the main required condition is the ability to allow the spreader beam of the thrust resistance device 14 to move freely when disengaged, without being hindered by the other two attachments 10 and 12.

Globally, the resistance device 14 that will be described below has two lateral thrust resisting connecting rods 26 (only one of which is visible is on FIG. 1), each of these rods comprising a forward end connected to the central casing 22, for example on or close to a horizontal median plane of the turbojet 6.

Figure 2:
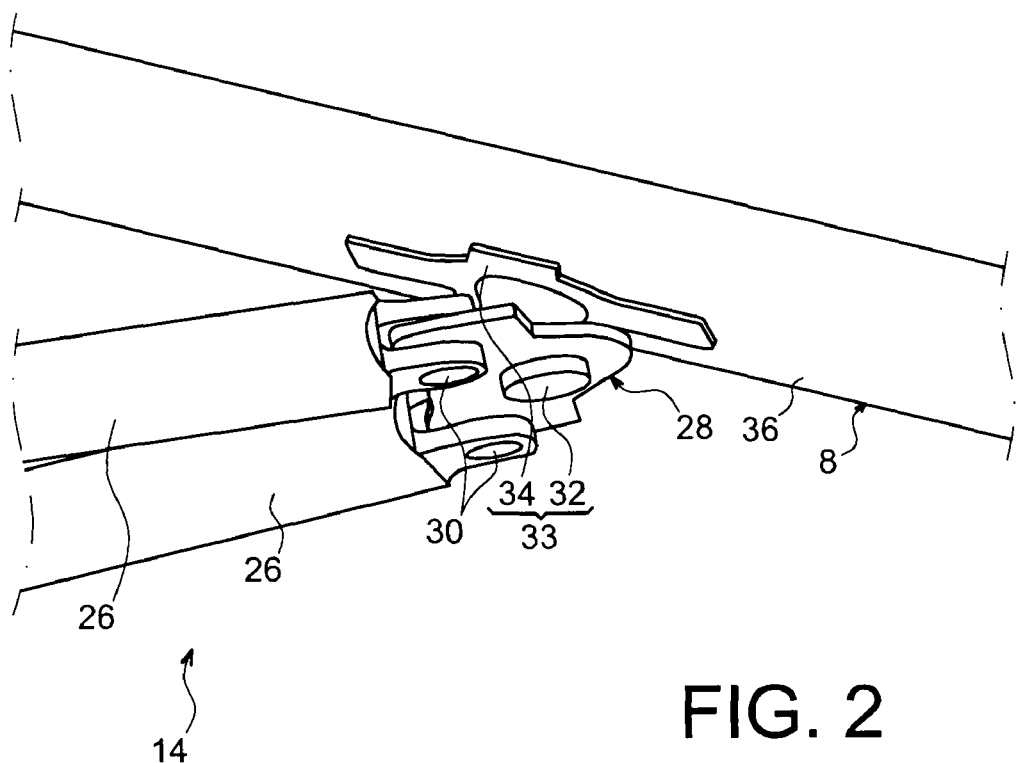
FIG. 2 shows a partial perspective diagrammatic view showing the thrust resistance device forming part of the suspension pylon shown in FIG. 1.

With reference to FIG. 2, it can be seen that each of the two lateral rods 26 has an aft end part connected hinged to a spreader beam 28 through pins 30, at an aft part of this thrust resisting device 14.

The spreader beam 28 is hinged on an arrangement 33 of the device 14, this arrangement 33 shown diagrammatically generally comprising a system of pins 32 and a fitting 34 installed fixed on a lower spar 36 of the rigid structure 8.

Figure 3A:
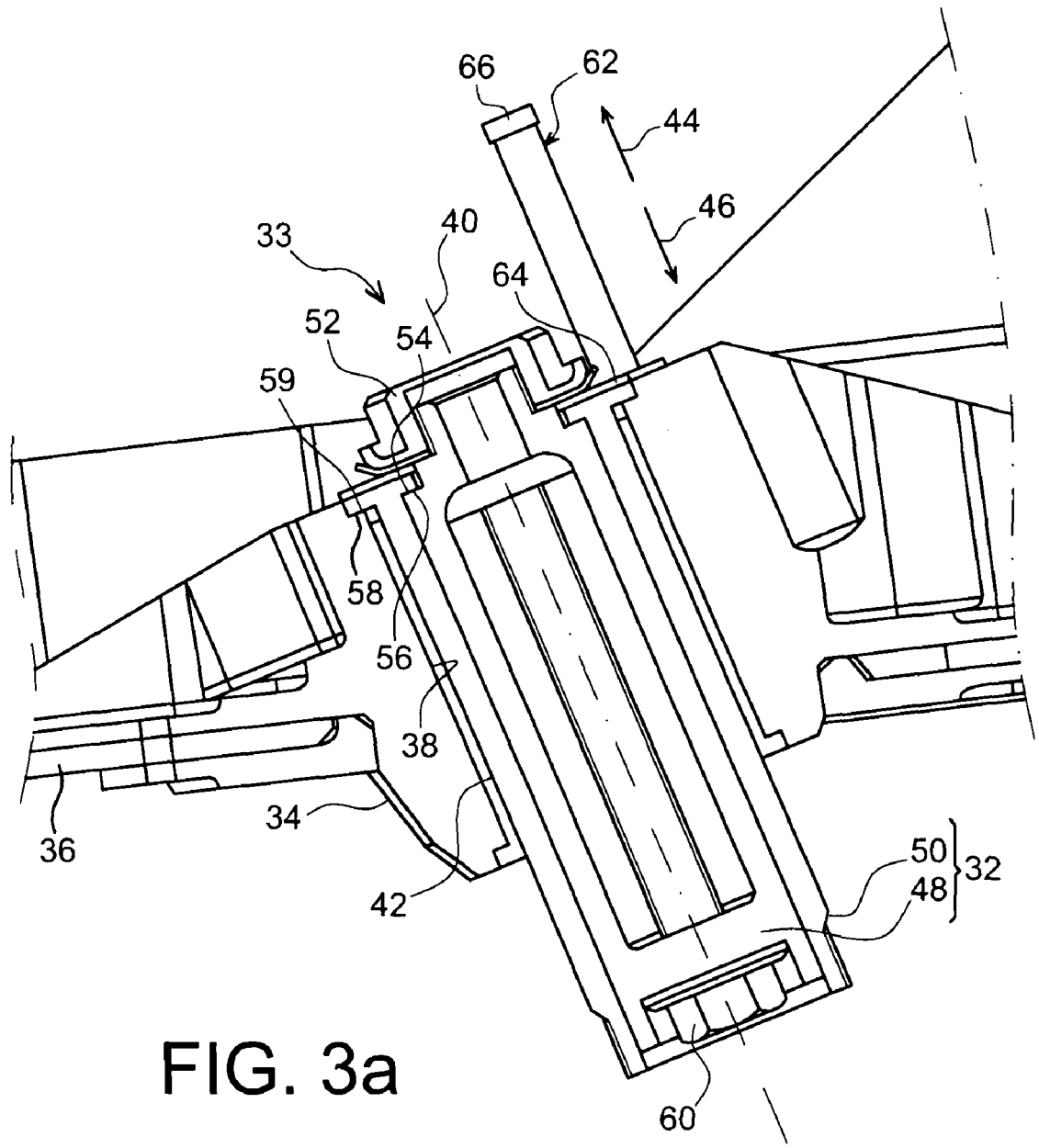
FIGS. 3a to 3d show detailed views of an arrangement forming part of the thrust resistance device shown on FIG. 2, this arrangement shown in different configurations being adapted to connect the spreader beam of the resistance device to the rigid structure of the suspension pylon.

Now with reference to FIG. 3*a*, we will describe an arrangement 33 adapted to connect the spreader beam 28 (not shown) to the rigid structure 8 of the suspension pylon 4. On this FIG. 3*a*, the arrangement 33 is shown in a configuration identical to that adopted later when the spreader beam is installed on the pin system 32. More precisely, therefore the pin system 32 occupies a so-called normal extracted position in which it projects sufficiently downwards with respect to the fitting 34 to be able to cooperate with the spreader beam 28.

Still with reference to FIG. 3*a*, it can be seen that the arrangement 33 comprises the fitting 34 installed fixed on the lower spar 36, for example between two directly consecutive ribs (not shown) on the rigid structure 8, this fitting 34 projecting downwards from the spar 36 and comprising a first passage of the pin system 38 extending along the first longitudinal axis 40. Preferably, the axis 40 is located in an XZ plane, and is inclined from the Z direction to extend in the aft direction, with the distance from the rigid structure 8 increasing towards the bottom.

Naturally, since the pin system 32 passes through the first passage of the pin system 38, it has the same inclination as the pin system that has just been described for the axis 40, namely it extends towards the aft direction at an increasing distance from the rigid structure. Furthermore, note that a sacrificial friction ring 42 may be inserted between the pin system 32 and the first passage 38.

One of the special features of this arrangement is that the pin system 32 is installed free to slide in the first passage 38 to enable it to slide along the first longitudinal axis 40, along the first direction 44, from the normal extracted position shown on FIG. 3*a* to a so-called retracted position in which it is retracted into the fitting 34 (FIG. 3*b*), and conversely in a second direction 46 opposite to the first direction, from the retracted position to the normal extracted position.

The pin system 32 preferably comprises an inner pin 48 and an outer pin 50 concentric with the inner pin, these two pins 48, 50 being fixed to each other through arbitrary means. In this preferred embodiment shown, this attachment between the outer pin 50 that can be qualified as the principal pin and the inner pin 48 that may be qualified as a <<Fail Safe>> type pin, is made by means of a combination between a limit stop and a nut 52 mounted on the upper end of the pin 48, bearing against an upper end of the pin 50. The above mentioned stop is obtained by shoulders 54, 56 respectively provided on the pins 48 and 50, and formed so as to be able to stop the upwards movement of the pin 48 from the pin 50 during screwing of the nut 52. Once this has been done, the pin system 32 becomes a compact and fixed assembly capable of sliding in the first passage 38.

The pin system 32 is kept in its normal extracted position shown on FIG. 3*a* by the use of stop means used to block it in translation in the second direction 46 with respect to the fitting 34. These stop means belonging to the pin system 32 are preferably in the form of a shoulder 58 provided on an upper end of the outer pin 50, therefore this shoulder 58 cooperating with an upper bearing surface 59 of the fitting 34.

On the other hand, note that the arrangement 33 is obviously designed to enable a translational displacement of the system 32 along the first direction 44 with respect to fitting 34, when this system occupies its normal extracted position.

Another special feature lies in the fact that the arrangement 33 comprises a pin extension device 60 carried on the inside by the inner pin 48 of the pin system, this device 60 being capable of being moved parallel to the first longitudinal axis 40 along the second direction 46, from a normal retracted position like that shown on FIG. 3*a* in which it is retracted in the inner pin 48, to an extracted position in which it is fixed to the pin system 32 and is projecting from it, and conversely in the first direction 44 from the extracted position to the normal retracted position. As will be presented in more detail later, deployment of the device 60 enables the device to easily penetrate through the passage provided in the spreader beam, when the pin system 32 is in its retracted position. In this way, the pin extension device 60 crossing through the pin system passage of the spreader beam and preferably extending beyond the spreader beam may thus form a gripping device, stop device, etc., that can easily accessed by an operator, and for which the movement being applied to it is transmitted directly to the pin system 32 that is also fixed to it. Consequently, it thus becomes easy to make the pin system 32 penetrate into the passage of the spreader beam pin system, by simply moving the device 60.

Therefore, the inner pin 48 is hollow so that the pin extension device 60 can be housed in it. Furthermore, in the preferred case in which the device 60 is composed of a simple screw, the inner pin 48 should have a thread designed to cooperate with this screw.

For information, it is noted that the ratio between the diameter of the screw 60 preferably arranged along the first longitudinal axis 40, and the diameter of the pin system 32 identical to the diameter of the outer pin 50, is preferably between 0.2 and 0.8.

Figure 4:
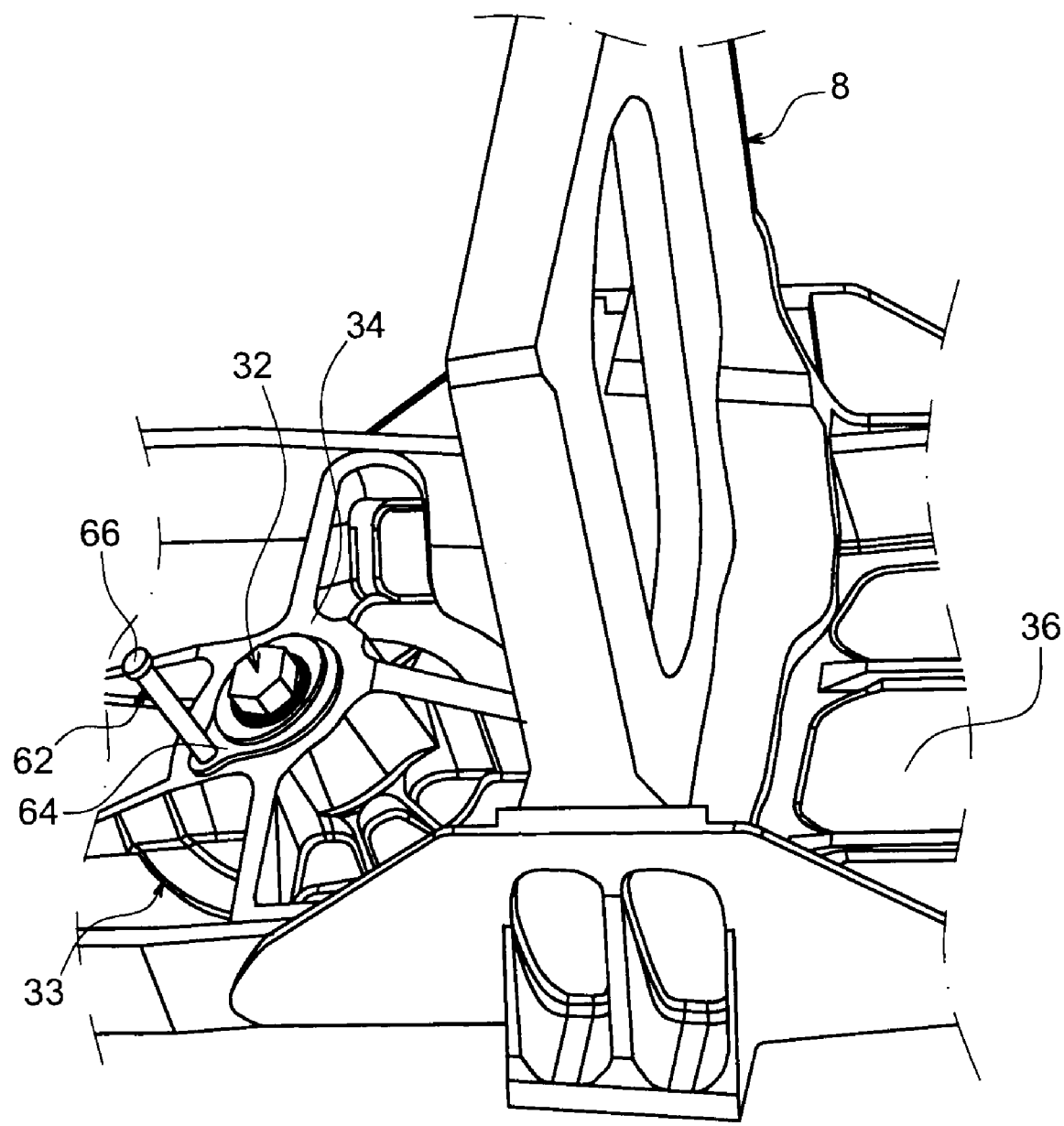
FIG. 4 shows a top view of the arrangement shown in FIGS. 3a to 3d.

Now with reference to FIGS. 3a and 4 jointly, it can be seen that the arrangement 33 comprises a guide device 62 for the pin system 32, that is added onto the fitting 34 and fixed to it. More precisely, this guide device 62 is in the form of a rod/arm arranged offset from the longitudinal axis 40 and parallel to it. It projects in the first direction 44 from an upper portion of the fitting 34, and passes through an orifice formed in a plate 64 fixed to the pin system 32, for example arranged between the nut 52 and the outer pin 50.

Consequently, when the pin system 32 is put into movement, the small clearance cooperation between the orifice of the plate 64 and the guide device 62 not only assures that the system 32 will translate along the direction of the axis 40 relative to the fitting 34, but especially blocks rotation of the system 32 around this first longitudinal axis 40.

Furthermore, the guide device 62 located within the rigid box is provided with a stop 66 capable of blocking the pin system in translation in the first direction 44 with respect to the fitting 34. This stop 66 is placed at the upper end of the rod, at a location such that it prevents the system 32 from total escaping from the first passage 38.

Figure 3B:
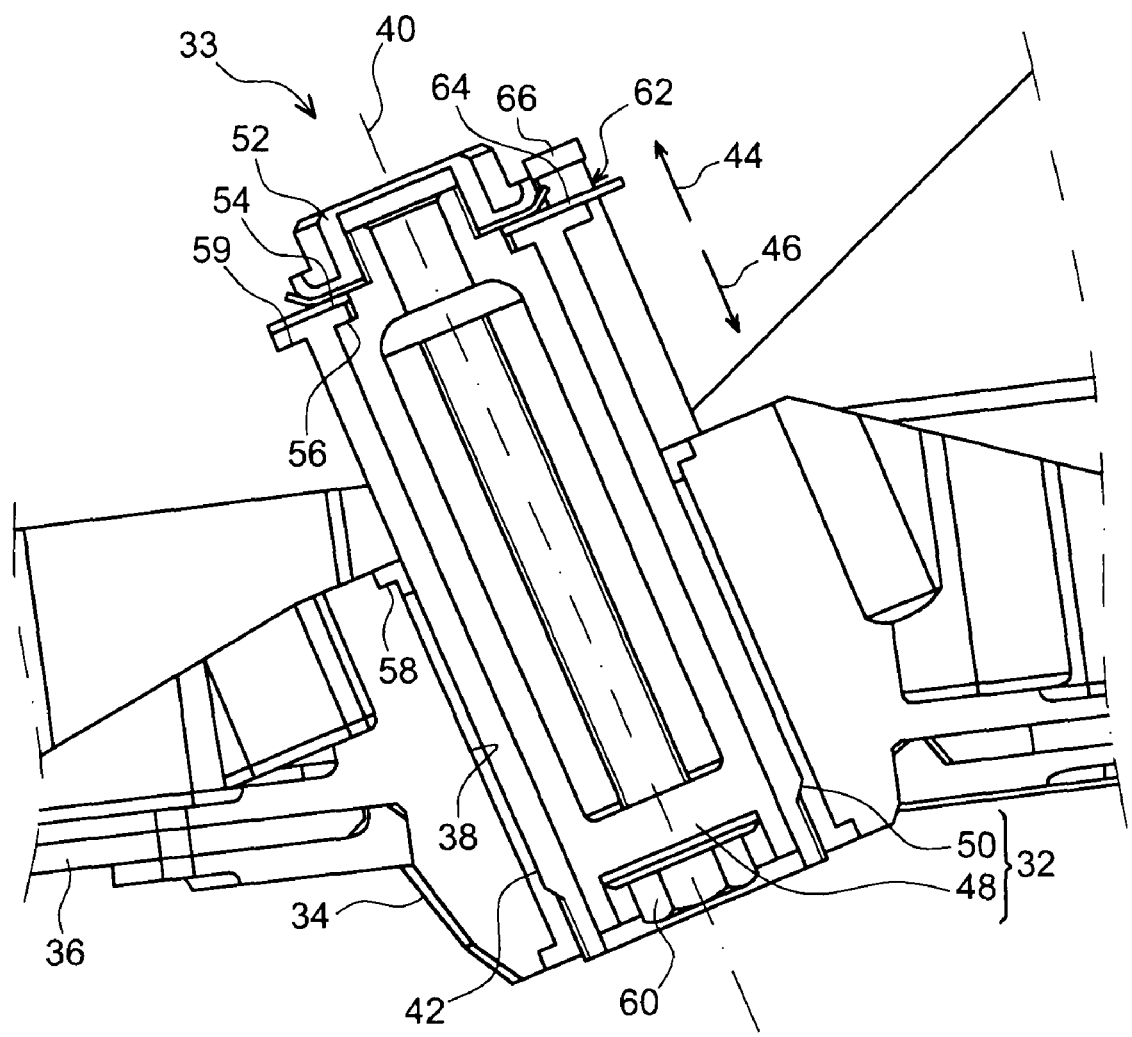

Now with reference to FIG. 3b, it can be seen that the arrangement 33 is in a different configuration called <<configuration II>>, in opposition to that shown in FIG. 3a corresponding to a normal rest configuration called <<configuration I>>, in which the pin system 32 has been displaced along the first direction 44 to move into its retracted position, in which it is retracted into the fitting 34, the pin extension device 60 still occupying its normal retracted position in which it is retracted into pin system 32. Preferably, it would be possible that in this configuration, the pin system 32 no longer projects downwards from the fitting 34. Moreover, it is indicated that this configuration may be maintained by the use of any means to prevent movement of the sliding pin system 32 relative to the fitting 34, in the second direction.

Figure 3C:
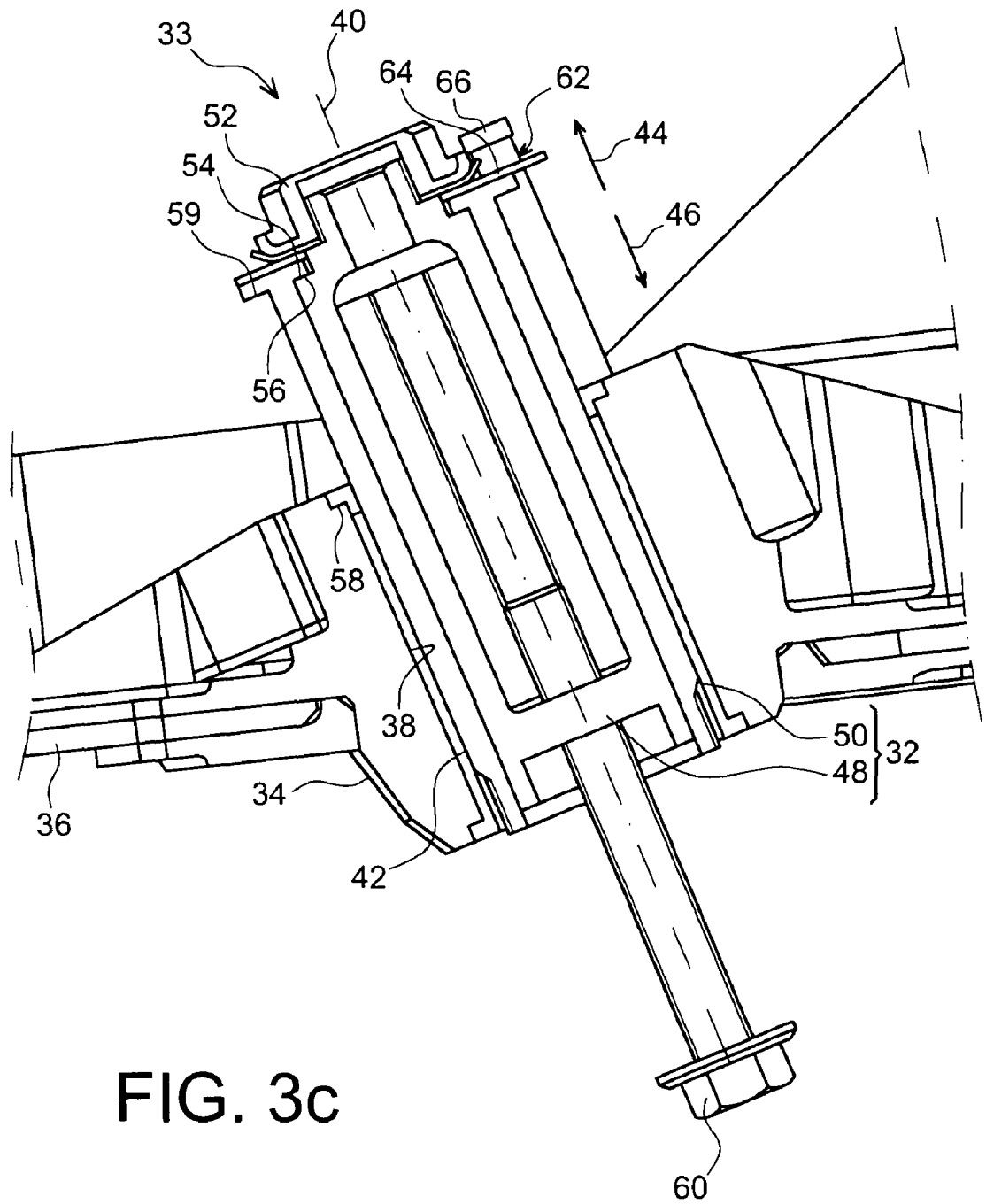

With reference to FIG. 3c, the figure shows the arrangement 33 in another different configuration called <<configuration III>> in which the pin system 32 is still in its retracted position retained by any means, whereas the pin extension device 60 has been moved along the axis 40 in the second direction 46 so as to adopt its extracted position in which it is fixed to the pin system 32 and is projecting from it, in the downwards direction. Naturally, the pin extension device 60 is displaced in the second direction 46 by unscrewing the screw. Furthermore, cooperation between the threads of this screw and the threads of the inner pin 48 can simultaneously retain the screw in its extracted position, while fixing this pin extension device 60 and the pin system 32 together.

Figure 3D:
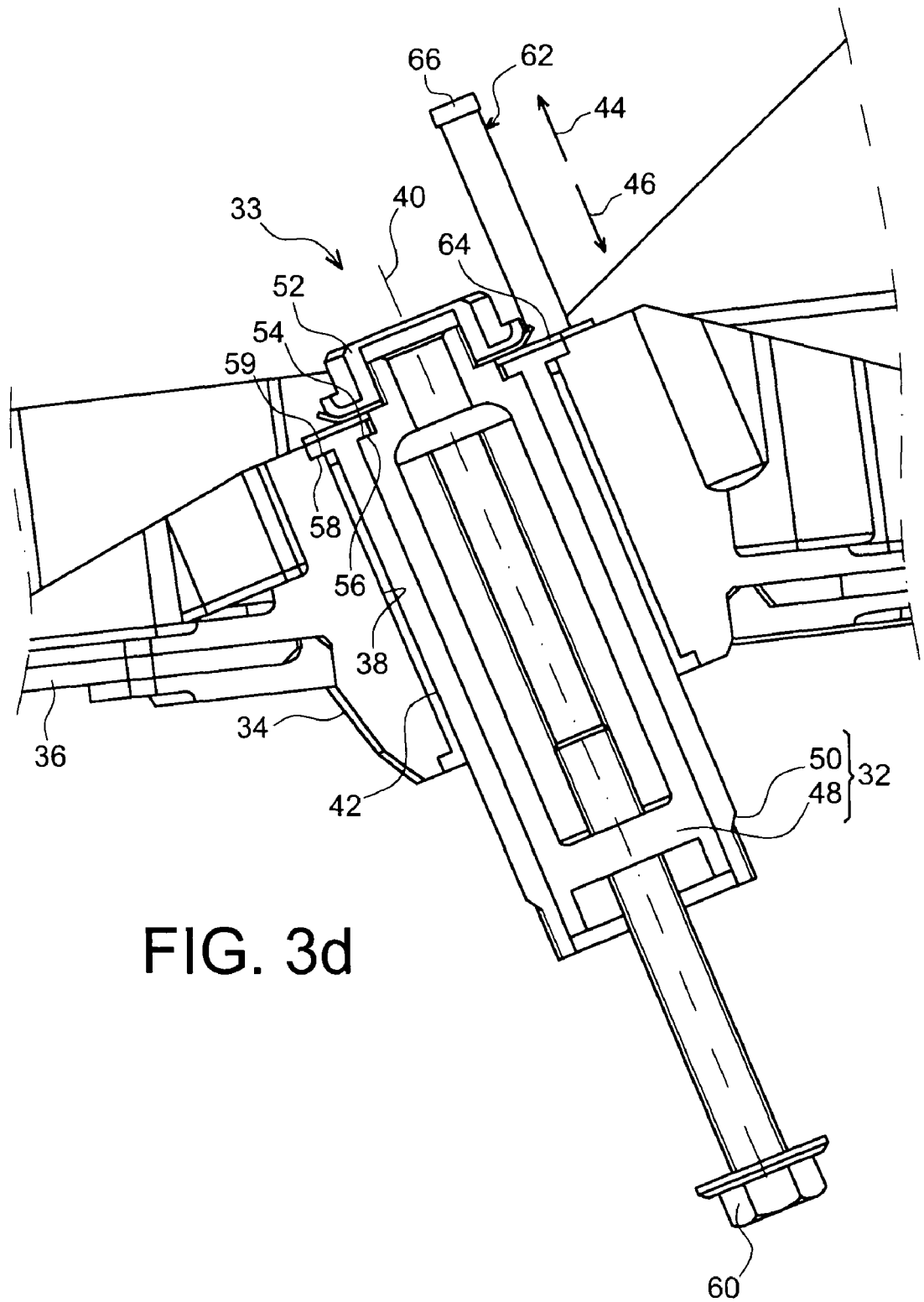

Finally, FIG. 3d shows another configuration called <<configuration IV>> in which the pin system 32 has moved back its normal extracted position, held by contact between the shoulder 58 of the pin 50 and the surface 59, while the pin extension device 60 remains in its extracted position.

All of these configurations are intended to be adopted one after the other by the arrangement 33 while using a method for assembling an aircraft engine on a rigid structure of an engine suspension pylon, as will become clearer below after reading the detailed description of such a process.

Now with reference to FIG. 5, the figure shows the thrust resistance device 14 represented in detail and including the arrangement 33 that has just been described, the device 14 then being shown in a fully assembled configuration identical to configuration I, in which the spreader beam 28 cooperates with the pin system 32.

As mentioned above, the thrust resistance device 14 comprises not only the arrangement 33, but also two thrust resistance lateral rods 26 each comprising a forward end connected to the engine, and an aft end connected to the spreader beam 28 comprising a second passage of the pin system 68. Therefore, this second passage 68 extends along a second longitudinal axis 70, which when the device 14 is in its fully assembled configuration as shown, is coincident with the first longitudinal axis 40. Furthermore, the pin system 32 of the arrangement 33 obviously passes through the second passage 68, and once again it is possible to provide a sacrificial friction ring 71 between the pin system 32 and the second passage 68.

The device 14 also comprises removable means for blocking the pin system 32 in translation, preventing translational movement of the pin system through the first and second passages 38, 68 in the first direction 44. Naturally, these means are mounted on the pin system 32 only after the pin system has passed through the second passage 68 to finalize assembly of the device 14.

Preferably, the removable translational blocking means comprise a nut 104 screwed onto a lower end of the outer pin 50, bearing on a lower bearing surface 74 of the spreader beam 28. Thus, once the resistance device 14 has been fully assembled, the pin system 32 is blocked in translation along the axis 40 in the two directions 44, 46 by cooperation between the shoulder 58 and the surface 59, and by cooperation between the nut 104 and the surface 74 respectively. Obviously, this blockage is obtained when the spreader beam 28 is bearing in contact with the fitting 34 supporting the pin system 32, without necessary be in direct contact with it.

Figure 5A:
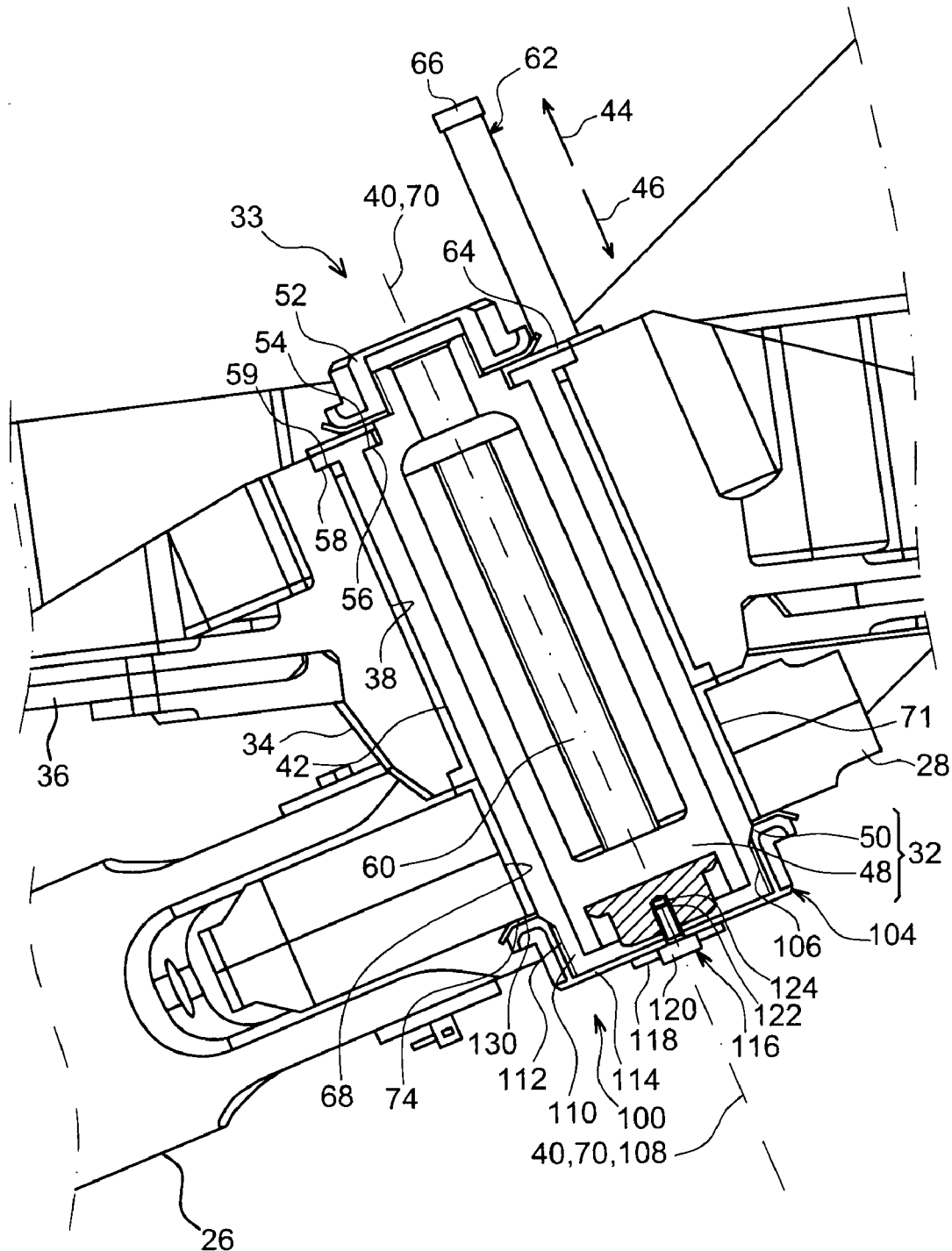
FIG. 5a shows a detailed side view of the thrust resistance device shown on FIG. 2, this device incorporating an arrangement like that shown on FIGS. 3a to 3d.
Figure 5B:
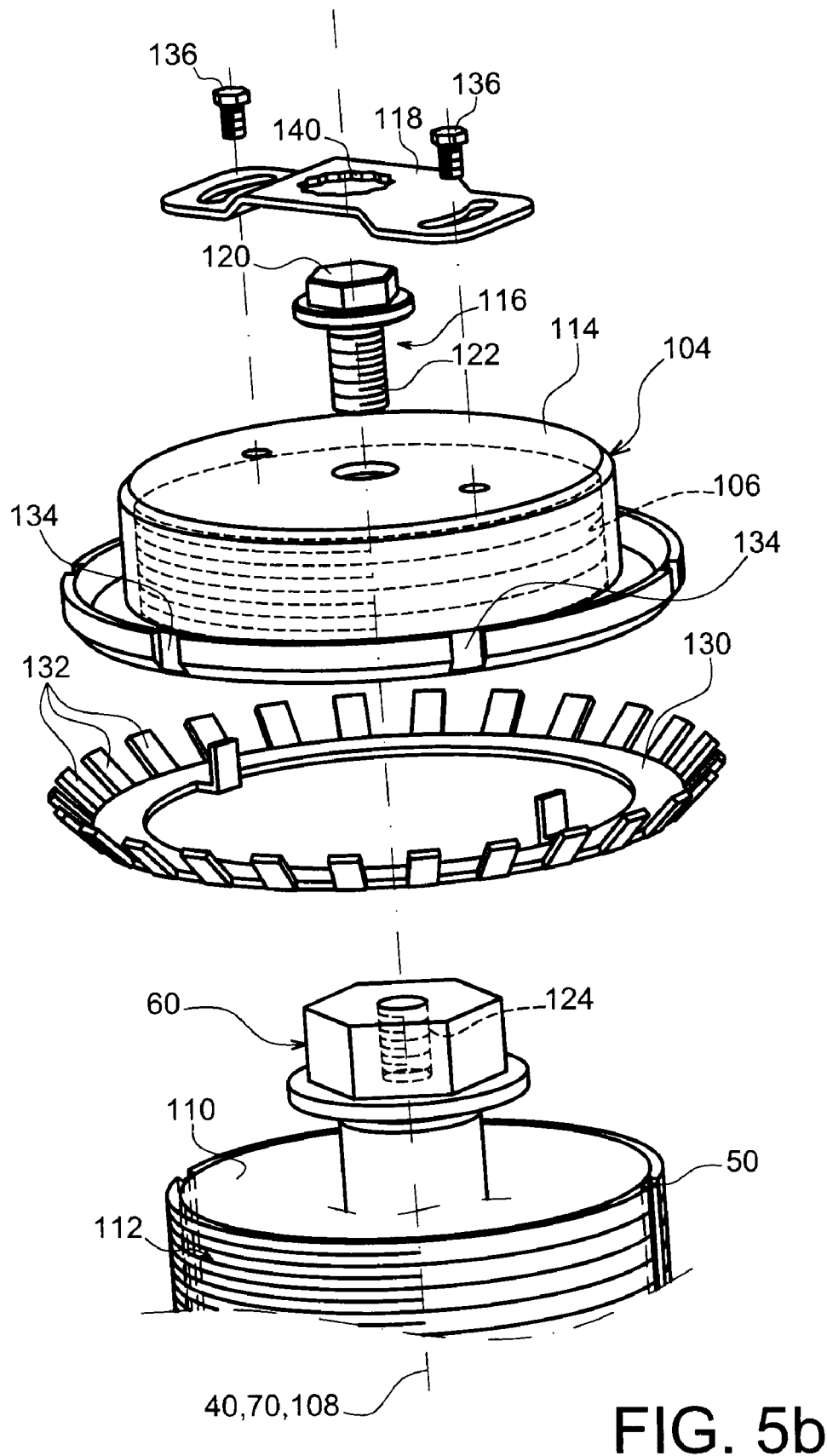

More precisely, as can be seen on FIGS. 5a and 5b, the removable translation blocking means are in the form of a nut system 100 such described above.

Thus, this system 100 is therefore intended to be assembled on a receiving assembly that comprises the pin system 32 and the extension device 60.

Therefore to achieve this, the nut 104 provided with the principal inner thread 106 is arranged along the screwing pin 108, which is coincident with the axes 40 and 70. This main thread 106 with pitch p1 is screwed onto the threaded end 110 of the outer pin 50, which has the complementary principal outer thread 112, also with pitch p1.

Also arranged along the screwing axis 108, there is the screw type threaded device 116 arranged so as to pass through the cap 114 of the nut 104. This threaded device 116 is coupled with this nut 104 in rotation, and is preferably fixed to it. This is done by using anti-rotation means 118 described more precisely below with reference to FIG. 5b.

Furthermore, this screw type threaded device 116 comprises the secondary thread 122 arranged along the axis 108 and with a pitch p2 different from p1 and preferably less than p1. This thread 122 is screwed into a hole on axis 108 formed on the head of the pin extension device 60 and provided with a complementary secondary inner thread 124 also with pitch p2.

More specifically with reference to FIG. 5b, an anti-rotation serrated washer 130 is inserted between the nut 104 and the spreader beam (not shown), the tabs 132 on this washer being designed to penetrate into the projections 134 provided in the nut 104, to prevent rotation of this nut.

Furthermore, the anti-rotation means described above are in the form of an anti-rotation plate 118 installed fixed on the cap 114 of the nut 104 through which the device 116 passes, for example through the screw 136. This plate 118 has an opening 140 in the form of a star in which the screw head 120 is housed, and to block it in rotation.

With such arrangement, it can be understood that if the outer pin 50 should fail, it will be retained by the nut 104, itself held in place by the screw 116 screwed onto the extension device 60, this screw 116 also being called a <<Fail Safe>> screw in that it performs an emergency function.

Similarly, if the inner pin 48 fails, it will also be retained by means of the nut 104 that remains held in place due to it being screwed onto the outer pin 50.

Now with reference to FIGS. 6a to 6d, the figures show the diagrammatic view of the different operations in a step to assemble the spreader beam 28 on the arrangement 33, this step being performed during implementation of a process for installing an aircraft engine on a rigid structure of an engine suspension pylon.

The first step during implementation of such a method is preferably to connect the spreader beam 28 to the engine 6 by means of connecting rods 26, while the arrangement 33 is previously mounted on the rigid structure 8, in waiting in configuration I.

The process then preferably begins conventionally by hoisting the engine 6 vertically towards the pylon 4 using conventional means, until this engine has reached its final position relative to the pylon or a position close to this final position.

At a given instant in the vertical displacement of the engine 6 towards its final position, the lower end of the pin system 32 of the arrangement 33 bears in contact with the spreader beam 28, following the movement of this same engine. In this respect, before hoisting, it is possible to install a guide olive 78 on a lower end of the system 32, like that visible on FIG. 6a, such that this olive coincides with the second passage 68 into which it is therefore liable to penetrate. In this way, the bearing of the olive 78 in contact with the upper part of the second passage 68 in which it partially penetrates implies that the system 32 is displaced in the first direction 44 near the end of hoisting the engine. Consequently, it can be understood that the system 32 is displaced automatically from its normal extracted position to its retracted position throughout the vertical displacement of the engine, simply by bearing in contact with the moving spreader beam 28.

Figure 6A:
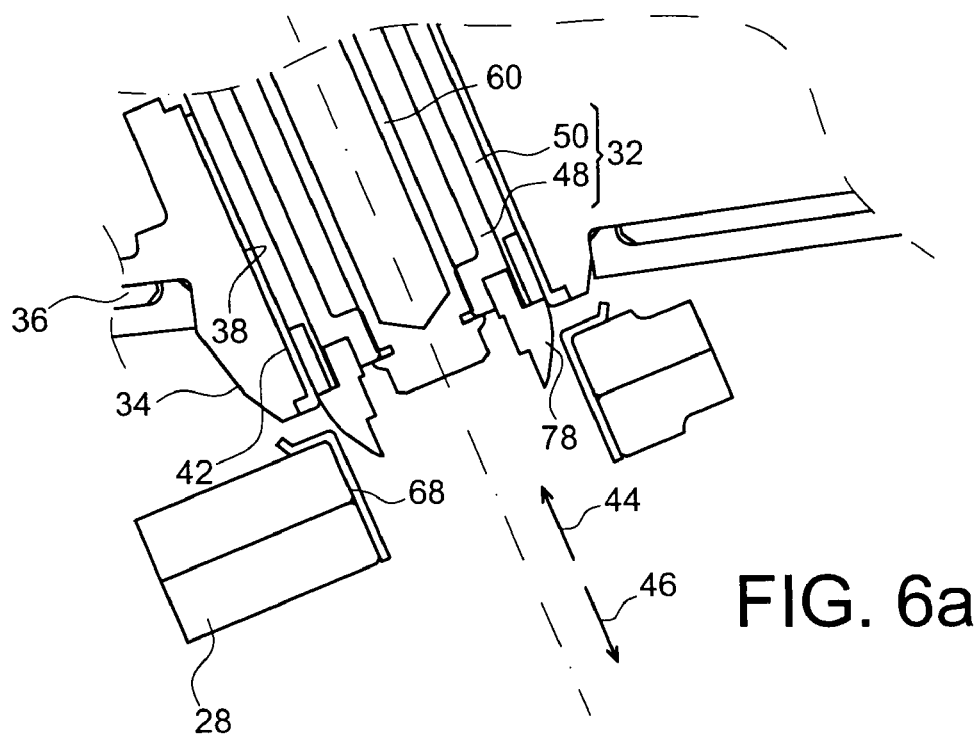
FIGS. 6a to 6d are views diagrammatically showing different operations in a step to assemble the spreader beam on the arrangement shown on FIGS. 3a to 3d, this step being done during implementation of a process to mount an aircraft engine on a rigid structure of an engine suspension pylon.

Therefore at this instant at which the engine is in its final position or a position close to its final position, the arrangement 33 is then kept in its configuration II by the spreader beam 28 as can be seen on FIG. 6a.

Next, an assembly step of the forward engine attachment 10 is preferably carried out, together with a step to assemble the aft engine attachment 12 onto the suspension pylon, in a conventional manner known to an expert in the subject.

The step to assemble the spreader beam 28 then begins when the pin system 32 is in its configuration II, shown in FIGS. 3b and 6a.

Figure 6B:
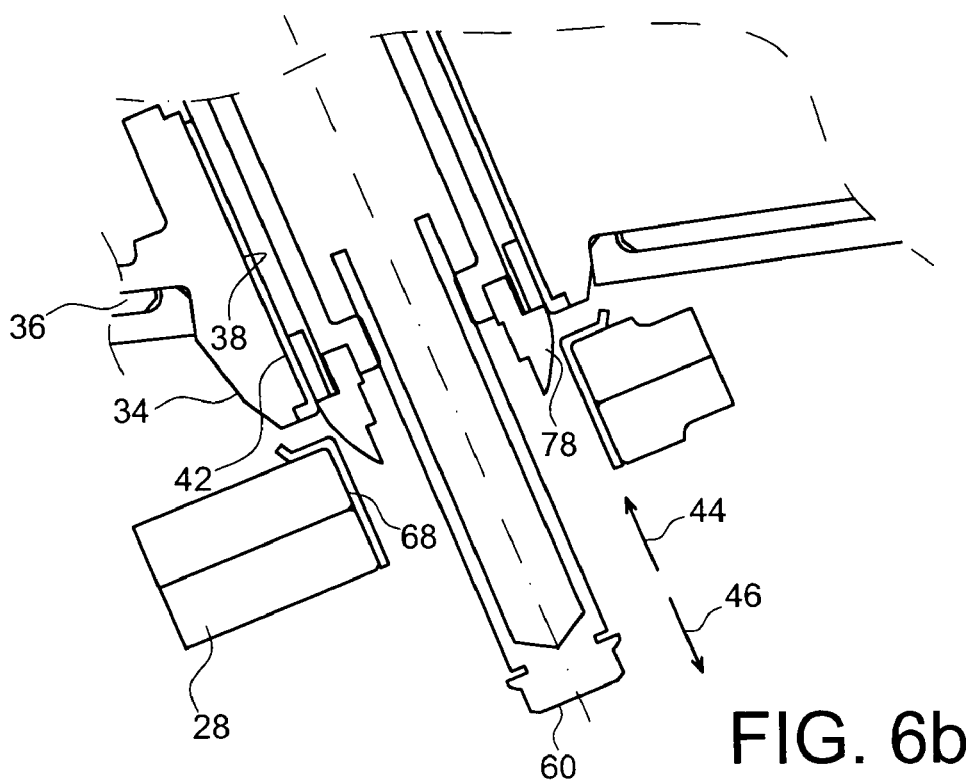
Figure 6C:
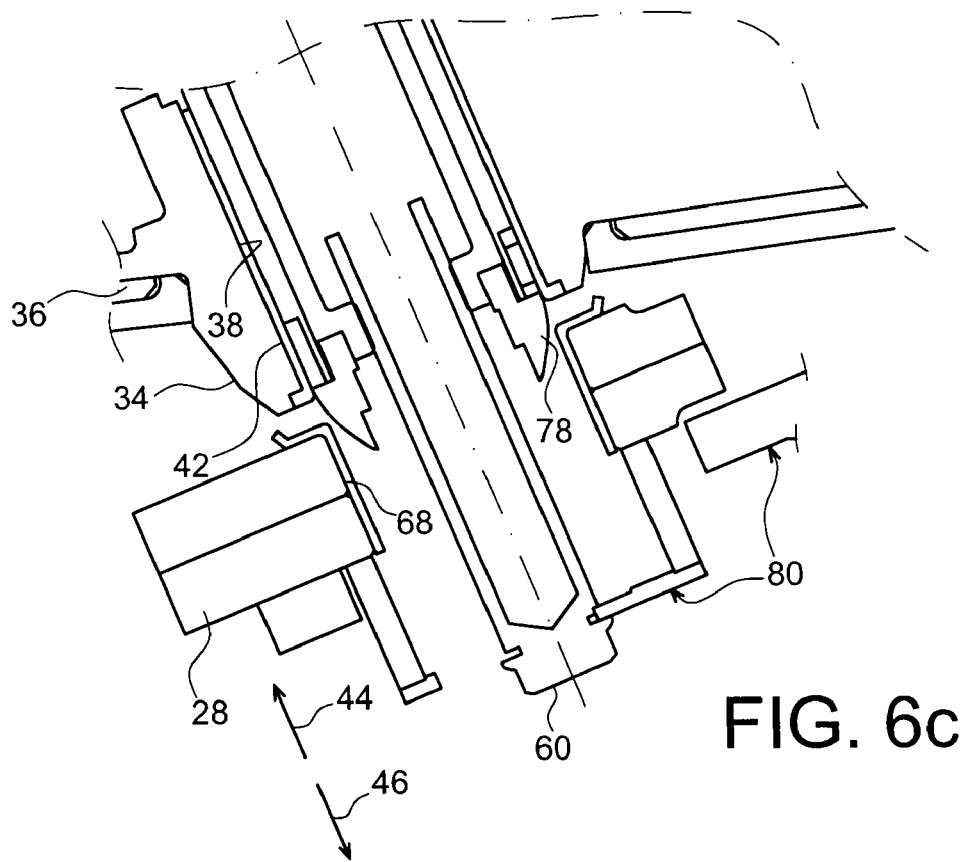
Figure 6D:
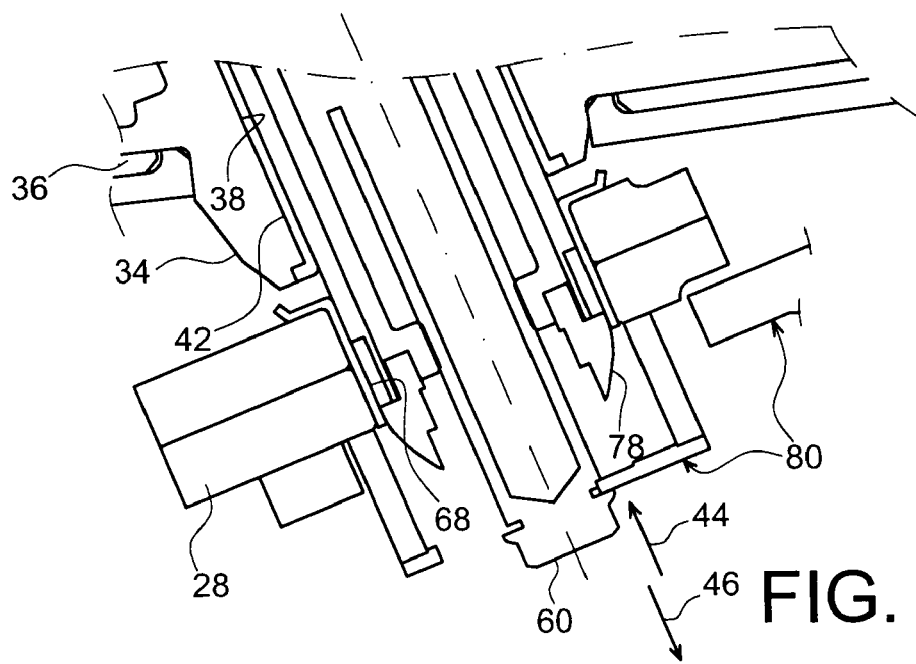

Starting from this moment, a first operation consists of moving the pin extension device 60 along the second direction 46 relative to the pin system 32 occupying its retracted position, such that it passes through the second passage 68 and until it reaches its extracted position as shown on FIG. 6b. The arrangement 33 is then in its configuration III, in which it can be seen that the extension device 60 projects well beyond the spreader beam 28 in the downwards direction. Naturally, this passage into the extracted position is made simply by unscrewing the screw 60, which requires no displacement of the pin system 32 which remains held in its retracted position.

The next step is an operation to move the pin extension device 60 so as to provoke displacement of the pin system 32 along the second direction 46, through the first and second passages 38, 68. This operation to start movements is shown diagrammatically on FIGS. 6c and 6d, and for example may be made using a tool designed to bear on opposite parts on the spreader beam 28 and on the pin extension device 60 respectively, like a <<bell>>. Once this bell 80 has been installed as mentioned above, then the screw 60 performing the worm screw function simply needs to be rotated to cause displacement of the inner pin 48, and therefore of the pin system assembly 32, in the second direction 46 of the outer pin 48, as shown diagrammatically on FIG. 6d. Therefore during this rotation, the screw 60 rotates while remaining in exactly the same position relative to the spreader beam 28 along the pin 40, while progressively penetrating into the pin system 32 moving in the second direction.

Finally, if necessary, an operation can then be applied to displace the pin extension device 60, always along the first direction 44, relative to the pin system 32 occupying its normal extracted position, so as to bring it into its normal retracted position. Obviously, this operation is done after retracting the bell 80, and only if rotation of the screw 60 done during the previous operation did not bring it into its normal retracted position.

Finally, after the guide olive has been withdrawn, the removable nut system type translation blocking means 100 are then assembled on the pin system 32, with the final result being the engine fully assembled on its associated suspension pylon, as shown on FIG. 5.

Obviously, those skilled in the art could make various modifications to the suspension pylon 4, to the thrust resistance device 14 and to the nut system 100 that have just been described, solely as non limitative examples. In this respect, it is particularly worth noting that although the invention has been described for use in suspending the engine into the aircraft wing, it could also be used to place this engine above this wing.

The invention claimed is:

1. A device that resists thrusts generated by an aircraft engine, the device configured to be inserted between an engine and a rigid structure of a suspension pylon of the engine, and comprising:

a fitting configured to be fixed on the rigid structure;
a pin system passing through the fitting;
two lateral thrust resistance rods each comprising a forward end to be connected to the engine and an aft end;
a spreader beam onto which the two aft ends of the lateral thrust resistance rods are hinged, the spreader beam being passed through by the pin system; and
a nut system, comprising:
  a nut comprising a main thread with pitch p1, the main thread arranged along a screwing axis of the nut; and a threaded device coupled in rotation and translation with the nut about the screwing axis, the threaded device comprising a secondary thread non-screwed on the main thread from which the secondary thread is separated, the secondary thread arranged along the screwing axis of the nut and having a pitch p2 different from p1, wherein the pitches p1 and p2 have the same direction, and the nut system is assembled on the pin system and bearing on the spreader beam.

2. A thrust resistance device according to claim 1, wherein the main thread and the secondary thread are configured to be screwed onto a complementary main thread with pitch p1 and onto a complementary secondary thread with pitch p2 respectively.

3. A thrust resistance device according to claim 1, wherein the threaded device is fixed to the nut.

4. A thrust resistance device according to claim 1, wherein the threaded device is a screw passing through the nut.

5. A thrust resistance device according to claim 4, wherein the screw is fixed to the nut through an anti-rotation plate fixed on the nut and cooperating with a head of the screw.

6. A thrust resistance device according to claim 1, further comprising a pin extension device supported on an inside thereof by the pin system.

7. A thrust resistance device according to claim 6, wherein the pin extension device is a screw fitted on the pin system, the screw penetrating inside the pin system.

8. A thrust resistance device according to claim 7, wherein the threaded device of the nut system is screwed onto the pin extension device.

9. A thrust resistance device according to claim 6, wherein the pin system comprises an inner pin and a concentric outer pin, the two pins being fixed to each other and the inner pin being hollow so that it can act as a housing for the pin extension device.

10. A thrust resistance device according to claim 9, wherein the nut in the nut system is mounted on the outer pin.

11. A thrust resistance device according to claim 9, further comprising an anti-rotation washer cooperating with the nut and being inserted between the nut and the spreader beam.

12. A suspension pylon for an engine configured to be inserted between an aircraft wing and the engine, the pylon comprising:

a rigid structure;

means for fastening the engine onto the rigid structure; and suspension means comprising the thrust resistance device according to claim 1 to resist thrusts generated by the engine.

13. A thrust resistance device according to claim 1, wherein the main thread is an inner thread of the nut.

14. A thrust resistance device according to claim 1, wherein the threaded device is unthreaded with the nut.

15. A thrust resistance device according to claim 5, wherein the threaded device is fixed to the nut only at the head of the screw.

16. A thrust resistance device according to claim 1, wherein the pitch p2 is less than the pitch p1.

17. A device that resists thrusts generated by an aircraft engine, the device configured to be inserted between an engine and a rigid structure of a suspension pylon of the engine, and comprising:

a fitting configured to be fixed on the rigid structure;

a pin system passing through the fitting;

two lateral thrust resistance rods each comprising a forward end to be connected to the engine and an aft end;

a spreader beam onto which the two aft ends of the lateral thrust resistance rods are hinged, the spreader beam being passed through by the pin system; and a nut system, comprising:

a nut comprising a main thread with pitch p1, the main thread arranged along a screwing axis of the nut; and a threaded device coupled in rotation and translation with the nut about the screwing axis, the threaded device comprising a secondary thread non-screwed on the main thread from which the secondary thread is separated, the secondary thread arranged along the screwing axis of the nut and having a pitch p2 less than p1 wherein the pitches p1 and p2 have the same direction.

18. An aircraft engine mounting assembly that resist thrust generated by an aircraft engine, comprising:

a receiving assembly; and a nut system, comprising:

a nut comprising a main thread with pitch p1, the main thread arranged along a screwing axis of the nut; and a threaded device coupled in rotation and translation with the nut about the screwing axis, the threaded device comprising a secondary thread non-screwed on the main thread from which the secondary thread is separated, the secondary thread arranged along the screwing axis of the nut and having a pitch p2 different from p1, wherein the pitches p1 and p2 have the same direction, and the nut system is mounted on the receiving assembly, the main thread being screwed onto a complementary main thread with pitch p1 formed on the receiving assembly, and the secondary thread being screwed on a complementary secondary thread with pitch p2 formed on the receiving assembly.

* * * * *